United States Patent

[11] 3,608,996

| [72] | Inventor | William E. Humphrey<br>Oakland, Calif. |
|---|---|---|
| [21] | Appl. No. | 757,288 |
| [22] | Filed | Sept. 4, 1968 |
| [45] | Patented | Sept. 28, 1971 |
| [73] | Assignee | Optical Research and Development Corporation<br>Oakland, Calif. |

[54] OPTICAL PATH DETOUR STABILIZATION SYSTEM
2 Claims, 4 Drawing Figs.

[52] U.S. Cl. ............................................... 350/16,
350/50, 356/149
[51] Int. Cl. .................................................... G02b 23/02
[50] Field of Search .......................................... 350/16;
356/143, 148, 149, 248, 250; 95/12.5; 74/5

[56] References Cited
UNITED STATES PATENTS

| 2,389,142 | 11/1945 | Esval et al. .................... | 356/149 |
| 3,424,520 | 1/1969 | Call ............................ | 350/16 |
| 3,261,260 | 7/1966 | Strang ......................... | 350/16 |

FOREIGN PATENTS

| 628,040 | 11/1961 | Italy ............................ | 350/16 |
| 347,869 | 10/1918 | Germany ...................... | 95/12.5 |
| 146,960 | 3/1962 | U.S.S.R. ...................... | 350/16 |
| 1,015,916 | 1/1966 | Great Britain ................ | 350/16 |
| 185,500 | 1/1967 | U.S.S.R. ...................... | 356/250 |

*Primary Examiner*—David H. Rubin
*Attorney*—Townsend and Townsend

ABSTRACT: An optical stabilizing device in which the image from an objective lens is passed through optics on an inertially stabilized platform, said platform comprising optics which divert the light rays from the optical path and return the light rays to the path in axial alignment with the light ray prior to divergence, the additional light path portion being a distance equal to one focal length of the objective lens.

PATENTED SEP 28 1971

3,608,996

WILLIAM E. HUMPHREY
INVENTOR.

BY

Townsend and Townsend

OPTICAL PATH DETOUR STABILIZATION SYSTEM

This invention relates to a new and improved optical-image-stabilizing system.

The object of the present invention is to provide an image-stabilizing system which stabilizes the viewed image formed by the objective lens of an optical device despite motion or vibration of the objective lens, viewing optics and housing. The invention is thus particularly applicable to hand-held cameras and telescopes or cameras and telescopes mounted on moving systems. For ocular viewing devices it may be adapted for either monocular or binocular use. "Viewing optics" and "viewing means" are used herein to include both camera viewing systems and ocular eyepiece systems.

In order to accomplish this result the present invention contemplates providing an inertially stabilized, pivotally mounted optical train interposed in the optical path between the telescope objective lens and viewing optics. The optical train is in the form of an optical path detour defined by an even number of plane deflecting surfaces rigidly mounted with respect to each other. The optical train is inertially stabilized for motion of the telescope objective, viewing optics and telescope housing relative to the optical train about a pivot point lying on the common optical axis of the telescope objective lens and viewing optics. The optical train is formed to increase the optical path between the telescope objective lens and the viewing optics a distance approximately equal to the focal length of the objective telescope lens by receiving light from the objective lens along the common optical axis of the objective lens and viewing optics, deflecting the light, and redirecting the light along the common optical axis toward the viewing optics.

According to one aspect of the invention, the optical train is formed by first and second pairs of reflecting surfaces, each pair in turn formed by two reflecting plane surfaces oriented at right angles to each other. The first and second pairs of reflecting surfaces are spaced apart and oriented with respect to each other with the reflecting plane surfaces in parallel alignment. The first pair is interposed in the optical path between the objective lens and viewing optics with reflecting plane surfaces facing at an angle toward the objective lens and viewing optics, respectively, along the common optical axis. The second pair is positioned to receive light from one surface of the first pair and retrodirect the light to the other surface of the first pair. From another point of view, the optical train is formed by two back-to-back periscopes. The first periscope receives and displaces light from the objective lens. The second periscope receives light from the first periscope and directs it toward the viewing optics.

It is possible with the image-stabilizing systems described above to achieve image stabilization of the type required for accidental-motion compensation, either with cameras or ocular viewing devices. In this respect, it is noted that for camera applications, accidental-motion compensators should maintain an image from the objective substantially stationary, or in a fixed position, on a film plane. In this way small accidental movements or vibrations of a camera housing to which the objective and film plane are mounted will be properly compensated so that a substantially 100 percent stabilized image is presented to the film at the coincident stabilized-image plane and film plane. On the other hand, ocular viewing devices such as ocular telescopes and binoculars ideally require a modified stabilization other than 100 percent so that center field light rays leaving the device are parallel to center field light rays entering the device and will therefore not appear to the viewer to be deflected with device vibrations. A full explanation of this difference in stabilization is set forth in my copending U.S. Pat. application Ser. No. 575,624, filed in the u.S. Pat. Office on Aug. 29, 1966, and entitled "Optical Stabilization by Reflecting Means" now U.S. Pat. No. 3,468,595, issued Sept. 23, 1969. Reference is made to such above-identified patent application for a complete discussion of this point; however, it is briefly noted herein that camera stabilization, or 100 percent stabilization, as it is sometimes termed, is to be modified by the factor $(1\pm(1/M))$ for ocular viewing devices wherein M is the magnification of the optical system. The fraction of "camera stabilization" required for erecting devices is $(1-(1/M))$ and, for inverting viewing devices, the fraction of "camera stabilization" is $(1+(1/M))$. In the following discussion of the present invention, reference is generally made to 100 percent camera stabilization; and it is to be understood that such is to be modified by the foregoing factor for ocular viewing devices, such as binoculars, ocular telescopes and the like.

Thus, in the embodiments of the invention summarized above, the increase in optical path length of one focal length of the telescope objective between the telescope objective and viewing means provided by the optical relay has been defined for 100 percent camera stabilization. Though such an arrangement is also satisfactory for ocular viewing devices and preferable to an unstabilized image, the ideal stabilization for ocular viewing devices is obtained by modifying the defined increase in optical path length by one of the factors described above.

For terrestrial and erecting ocular telescopes and binoculars, the additional optical path length provided by the optical train should be decreased by a factor of $(1-(1/M))$ times that required for 100 percent camera stabilization. For astronomical and inverting telescopes, the additional optical path length should be increased by a factor of $(1+(1/M))$ times that required for 100 percent camera stabilization.

In the following specification and accompanying drawings, the increase in optical path length between the telescope objective and viewing optics provided by the optical relay is defined to provide 100 percent camera stabilization. Ideally, for ocular viewing devices the increase in optical path length is to be modified accordingly by the factors indicated above. One hundred percent camera stabilization provides satisfactory results in most cases, however.

Other features of the invention will become apparent in the following specification and accompanying drawings.

Figure 1:
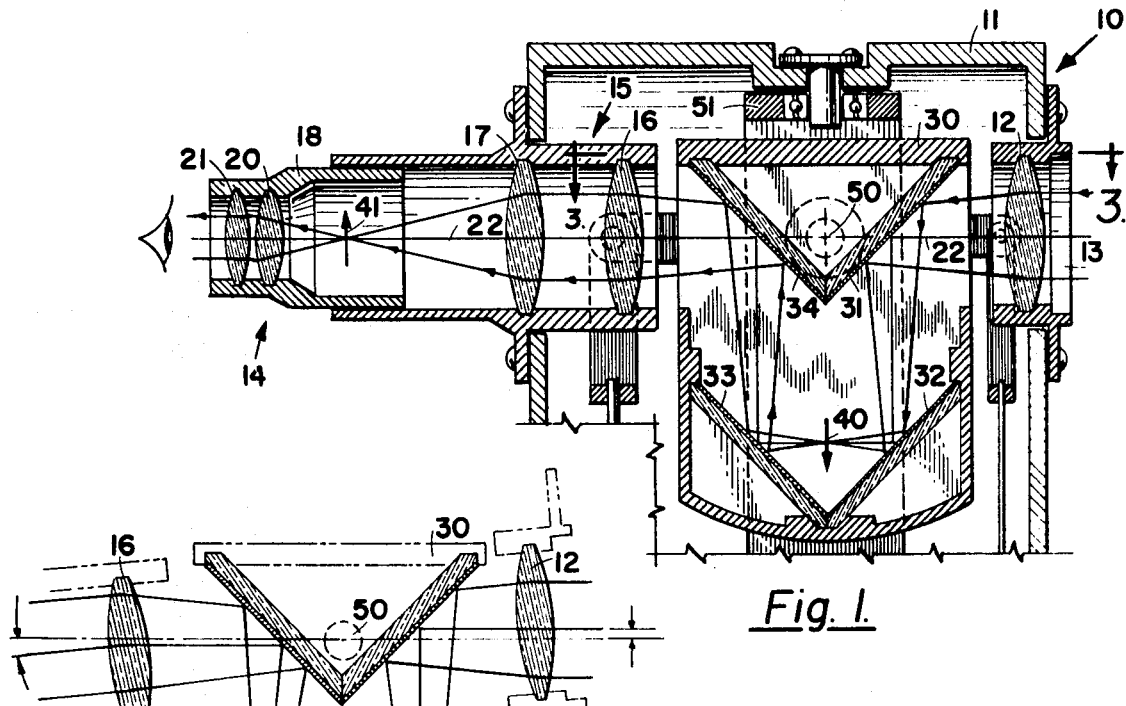
FIG. 1 is a side cross-sectional view of a telescope image stabilization embodying the present invention.

In the embodiment of the present invention illustrated in FIG. 1, there is provided a telescope 10 formed of a housing 11 in which are rigidly mounted the telescope objective lens 12, light-receiving window 13, and viewing optics 14. The viewing optics in this example consist of a lens-erecting system 15 formed by spaced-apart lens 16 and 17 and eyepiece 18 formed by lenses 20 and 21 for viewing the erect image formed by the telescope objective lens 12 and lens erecting system 15. The telescope objective lens 12, lens-erecting system 15 and eyepiece 18 are rigidly oriented with respect to a common optical axis 22.

An optical train 30 is interposed in the optical path between the objective lens 12 and lens erecting system 15. The optical train is formed by four reflecting surfaces 31, 32, 33 and 34, which define an optical path "detour" between the telescope objective lens 12 and lens-erecting system 15. The reflecting surfaces are arranged in first and second pairs of reflecting surfaces oriented at right angles to each other and the two pairs of reflecting surfaces are spaced from each other and oriented with the reflecting surfaces respectively parallel. The first pair of surfaces 31 and 34 is interposed in the optical path between the telescope objective lens 12 and lens-erecting system 15 with the reflecting surfaces 31 and 34 respectively facing the telescope objective lens 12 and lens-erecting system 15 along the common optical axis 22. The second pair of reflecting surfaces 32 and 33 is spaced from the first pair with the reflecting surfaces 32 and 33 facing the first pair of reflecting surfaces. Light received from the telescope objective lens 12 along the common optical axis 22 is deflected by reflecting surface 31 onto the reflecting surface 32 and retrodirected by reflecting surface 33 to the reflecting surface 34 so that the light is redirected towards the lens-erecting system 15 along the common optical axis 22. Light from an image 40 formed by the telescope objective lens is then erected by the lens-erecting system 15 forming an erect image 41 to be viewed by the eyepiece 18.

From another point of view, reflecting plane surfaces 31 and 32 form a first periscope which receives and displaces light from the objective lens 12. Reflecting surfaces 33 and 34 form a second periscope back-to-back with the first periscope. The second periscope received light from the first and displaces it back onto the optical axis directed toward the viewing optics.

The pairs of reflecting surfaces are spaced from each other a distance sufficient to provide an increase in the optical path between the objective lens 12 and lens-erecting system 15 a distance approximately equal to the focal length of the objective lens 12.

The optical train 30 is mounted independently from the telescope housing for free movement relative to the telescope objective lens 12, lens-erecting system 15 and eyepiece 18 about a pivot point 50 lying along the common optical axis of the telescope objective lens and viewing optics and intermediate the reflecting surfaces 31 and 34. The universal pivot point 50 is provided, for example, by the orthogonal axes of rotation of gimbal mountings 51. The optical train 30 is inertially stabilized for relative motion with respect to the telescope objective lens and viewing optics about the pivot point 50. The optical train 30 is inertially stabilized, for example, by a gimbal mounted gyroscope. Gyroscope mounting and linkage systems suitable for mounting and stabilizing the optical train are described in my copending U.S. Pat. application Ser. No. 757,252, filed Sept. 4, 1968 entitled "Optical Device Gyro Linkage System." The optical train may be mounted for free rotation in either one plane or two orthogonal planes. Thus, the optical train 30 and gyroscope flywheel are mounted on gimbals providing a universal pivot point at 50, a point lying along the common optical axis of the objective leans and viewing optics and intermediate the reflecting surfaces of the optical relay. The positioning of the optical train 30 and pivot point 50 along the common optical axis 22 between the objective lens 12 and lens-erecting system 15 is not critical and the optical train may be positioned conveniently at any point along the common optical axis. However, the increase in optical path between the telescope objective lens 12 and lens-erecting system 15 defined by the four reflecting surfaces must be approximately equal to the focal length of the objective lens.

Any number of reflecting surfaces which do not rotate or invert the image may be used for the optical train. Thus, instead of two pairs of reflecting surfaces each in the configuration of a V, two pairs of reflecting surfaces each in the configuration of a W could also be used, thereby providing eight reflecting surfaces.

Figure 2:
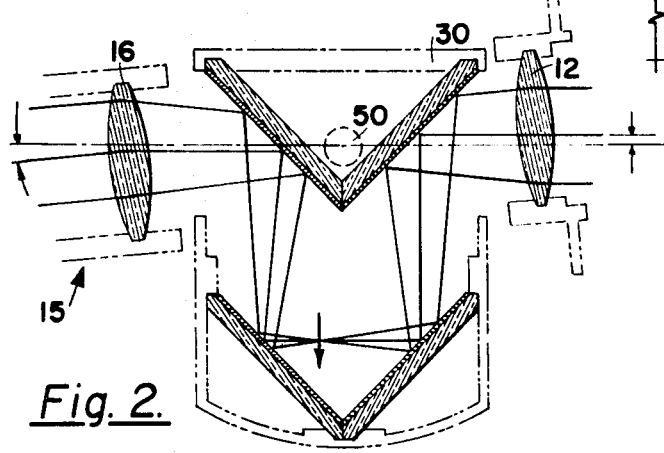
FIG. 2 is a fragmentary side cross-sectional view of the telescope-image-stabilizing system showing relative movement between the optical relay and telescope objective lens and viewing optics.

In FIG. 2 there is illustrated an orientation of the inertially stabilized optical train 30 and the telescope objective lens 12 and lens-erecting system 15 after relative movement of the objective lens and lens-erecting system about the universal pivot point 50 in a vertical plane. The image formed by objective lens 12 and viewed through the erecting system 15 and eyepiece 18 is stabilized within the optical train 30 upon motion or vibration of the telescope housing and objective leans and viewing optics.

Figure 3B:
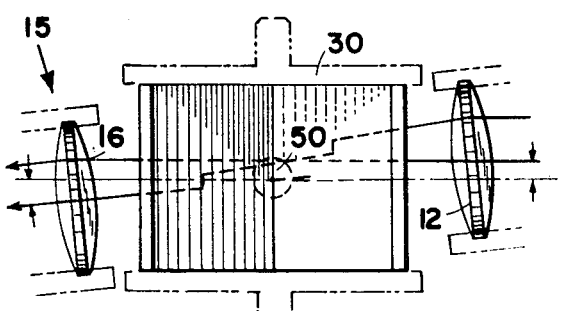
FIG. 3b is a fragmentary cross-sectional plan view showing relative movement between the optical relay and the telescope objective lens and viewing optics.
Figure 3A:
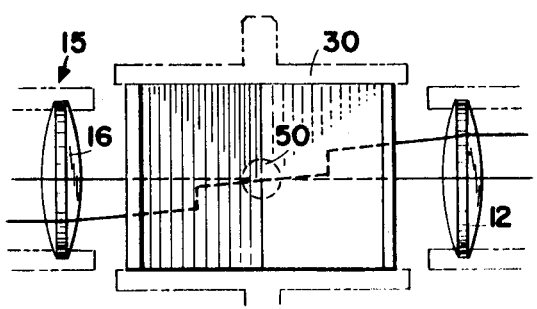
FIG. 3a is a fragmentary cross-sectional plan view of the telescope objective lens viewing optics, and optical relay.

FIG. 3a shows a plan view of the orientation of the telescope objective lens 12 and erecting system 15 with the optical train 30 in axial alignment while in FIG. 3b there is shown an orientation of the telescope objective lens 12 and lens-erecting system 15 about the universal pivot point 50 in a horizontal plane. Similarly, the image formed by objective lens 12 and viewed through the lens-erecting system 15 and eyepiece 18 is stabilized within the optical train 30 upon motion or vibration of the telescope housing, objective lens and viewing optics.

In order to collect or concentrate light in the optical train 30 and for other purposes, lenses may be included in the optical train either mounted for movement with the optical train, or mounted to the housing of the device. Thus, for example, a field lens can be positioned at the image plane 40, illustrated in FIG. 1.

Ideally, for telescopes and binoculars, the optical train should be formed to increase the optical path length between the telescope objective and eyepiece system by an amount equal to $(1\pm(1/M))$ times the focal length of the telescope objective.

What is claimed is:

1. An image-stabilizing system comprising an objective lens means adapted to form an image; viewing means optically aligned and spaced from said objective lens means for viewing the image formed by the objective lens means, said viewing means and objective lens means rigidly mounted with respect to each other, an optical train comprised of an optically aligned optical path detour defined by an even number of reflecting surfaces arranged to provide an unrotated image and rigidly mounted with respect to each other and interposed between said objective lens means and said viewing means in the optical path between said objective lens means and the viewing means, said optical train is formed to increase the optical path distance between the objective lens means and the viewing means a distance substantially equal to the focal length of the objective lens means, said reflective surfaces optically aligned to receive light from the objective means, deflect the light and redirect the light toward the viewing means; means pivotally mounting said optical train for free movement relative to the objective lens means and viewing means; and means inertially stabilizing said optical train to maintain its orientation along the desired line of sight.

2. An image-stabilizing system as set forth in claim 1 wherein said viewing means comprises an ocular eyepiece system and said optical train is formed to increase the optical path length between the objective lens means and viewing means a distance approximately equal to $(1\pm(1/M))$ times the focal length of the objective lens means and viewing means system wherein M equals the magnification of the stabilizing system and wherein the minus sign is used for erecting telescopes and the plus sign is used for inverting telescopes.